United States Patent

Noy

[11] Patent Number: 5,909,945
[45] Date of Patent: Jun. 8, 1999

[54] TRACTION AUGMENTATION DEVICE

[76] Inventor: Thomas E. Noy, 7966 Miami Beach Rd., Seabeck, Wash. 98380

[21] Appl. No.: 09/011,643
[22] PCT Filed: Aug. 12, 1996
[86] PCT No.: PCT/US96/13107
§ 371 Date: Feb. 12, 1998
§ 102(e) Date: Feb. 12, 1998
[87] PCT Pub. No.: WO97/06707
PCT Pub. Date: Feb. 27, 1997

Related U.S. Application Data

[60] Provisional application No. 60/002,310, Aug. 14, 1995.
[51] Int. Cl.[6] .............................. A43B 3/10; A43B 15/00; B60C 11/00; B60C 27/00
[52] U.S. Cl. ............................... 36/7.6; 152/208; 152/221
[58] Field of Search ..................... 36/7.1 R, 7.6, 36/62; 152/208, 217, 221

[56] References Cited

U.S. PATENT DOCUMENTS

| | | | |
|---|---|---|---|
| 1,350,484 | 8/1920 | Bailey | 152/221 |
| 1,932,576 | 10/1933 | Dodge | 152/221 |
| 3,359,659 | 12/1967 | Smolnik | 36/7.6 |
| 5,315,768 | 5/1994 | Pacheco | 36/62 X |

Primary Examiner—B. Dayoan
Attorney, Agent, or Firm—Christensen O'Connor Johnson & Kindness PLLC

[57] ABSTRACT

An elasticized sock (22) is formed from a cowling of elastomer material which is so limp in the normally relaxed state thereof as to be essentially formless; and the sock is stretched about the outer periphery (18) of a movable boss, i.e., the welt of a shoe sole (2), the flange of a brake pedal, or the tire of a car wheel, and tightly engaged with the boss so as to interpose a portion of the sock between the boss and an interactive surface there opposite. Part of the elasticity with which the sock is stretchable about the boss, arises from the fact that the portion of the sock interposed between the boss and the interactive surface, comprises a network of elongated strands of elastomer material which lends elasticity to the portion. However, the portion also has an exoskeleton of elongated resiliently flexible coils of hard durable traction material loosely helically wound about strands of the network to carapace the network against abrasive action of the footprint of engagement between the boss and the interactive surface, and form a gallery of elongated protective cavities for the strands, i.e., the bores of the coils, within which the network can flex resiliently during the step of stretching the sock about the boss, and during any subsequent movement of the sock in relation to the boss and the interactive surface at the footprint of engagement therebetween.

22 Claims, 8 Drawing Sheets

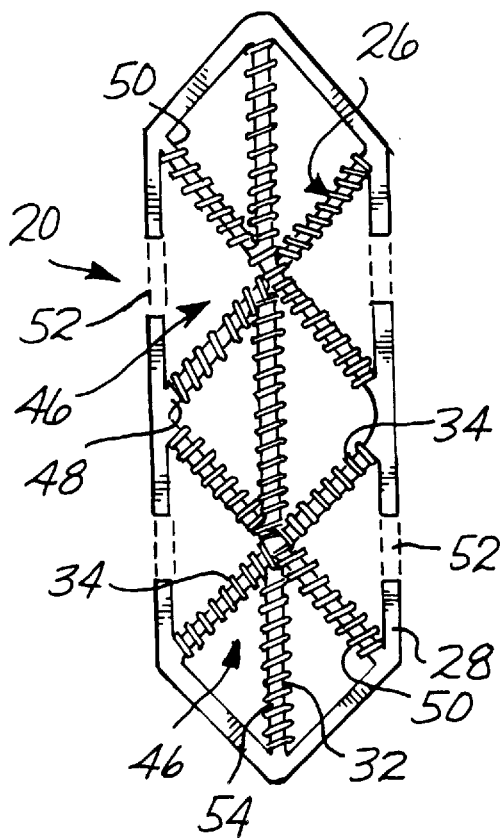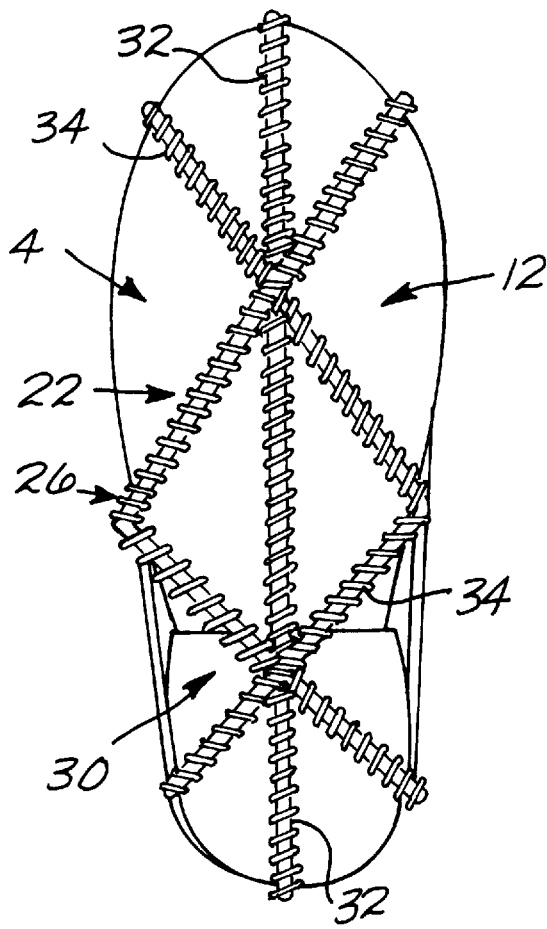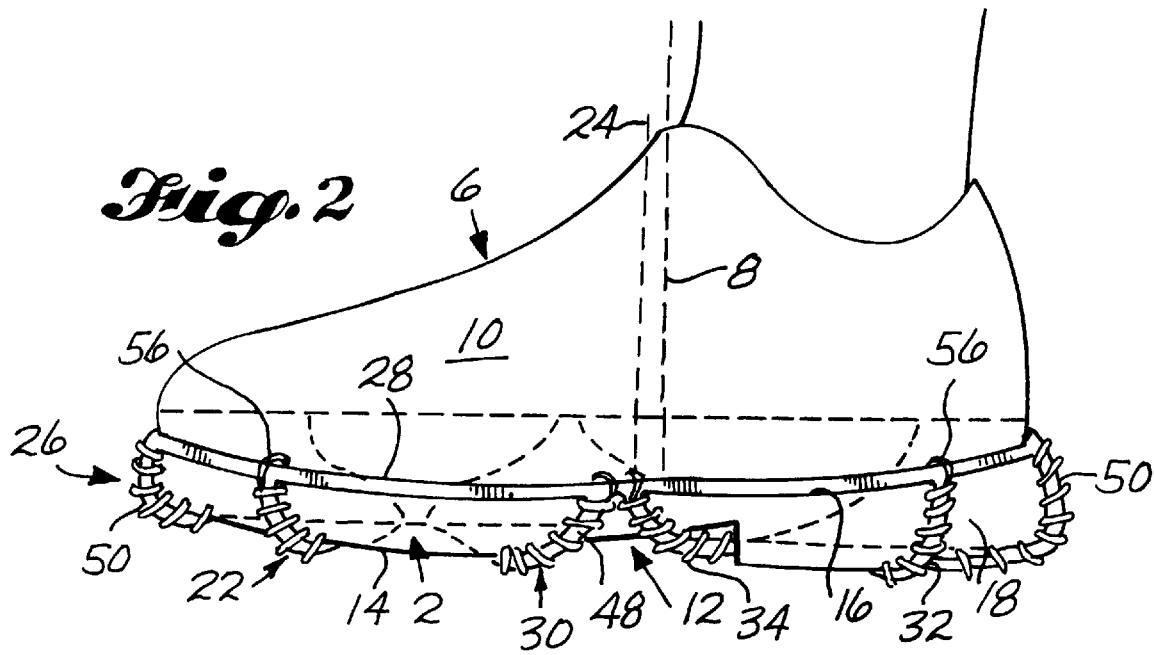

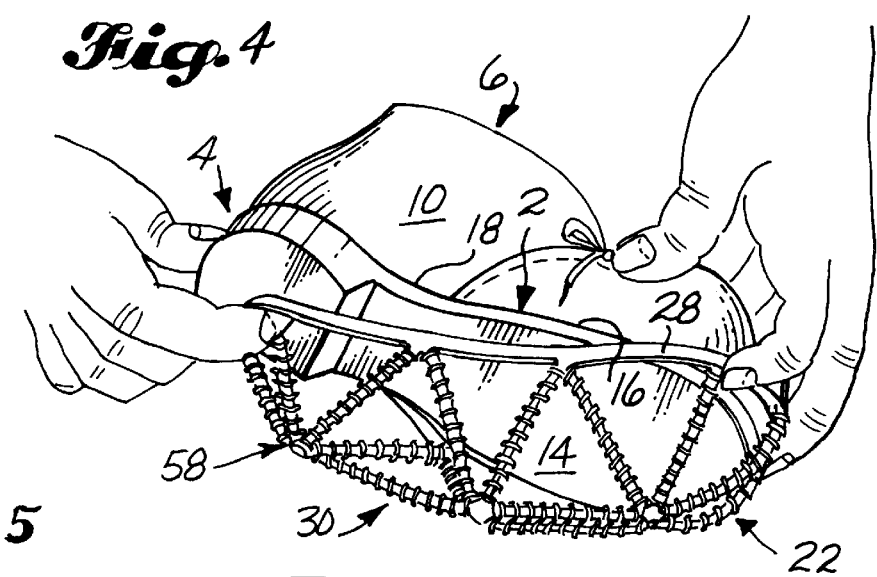
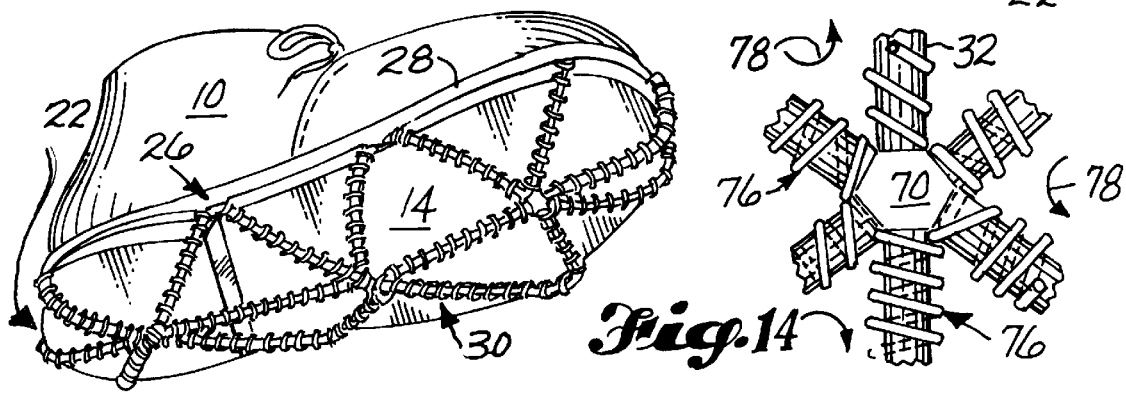
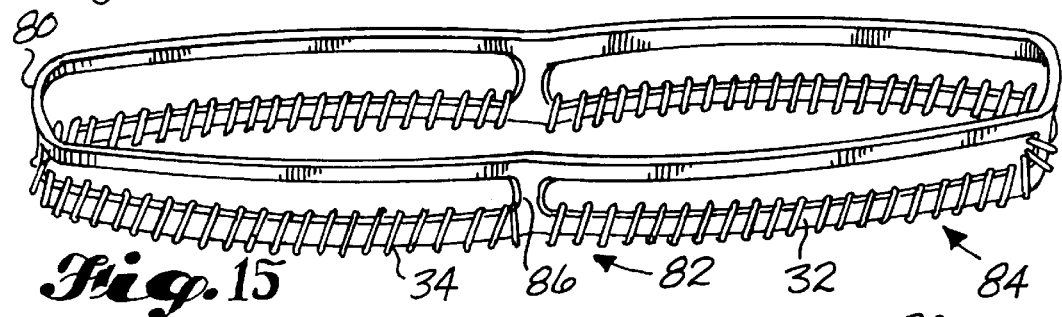
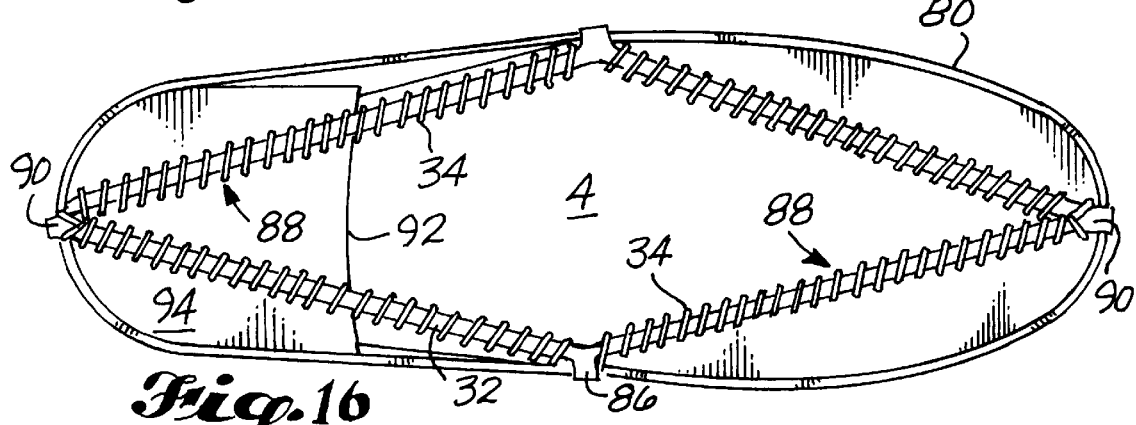

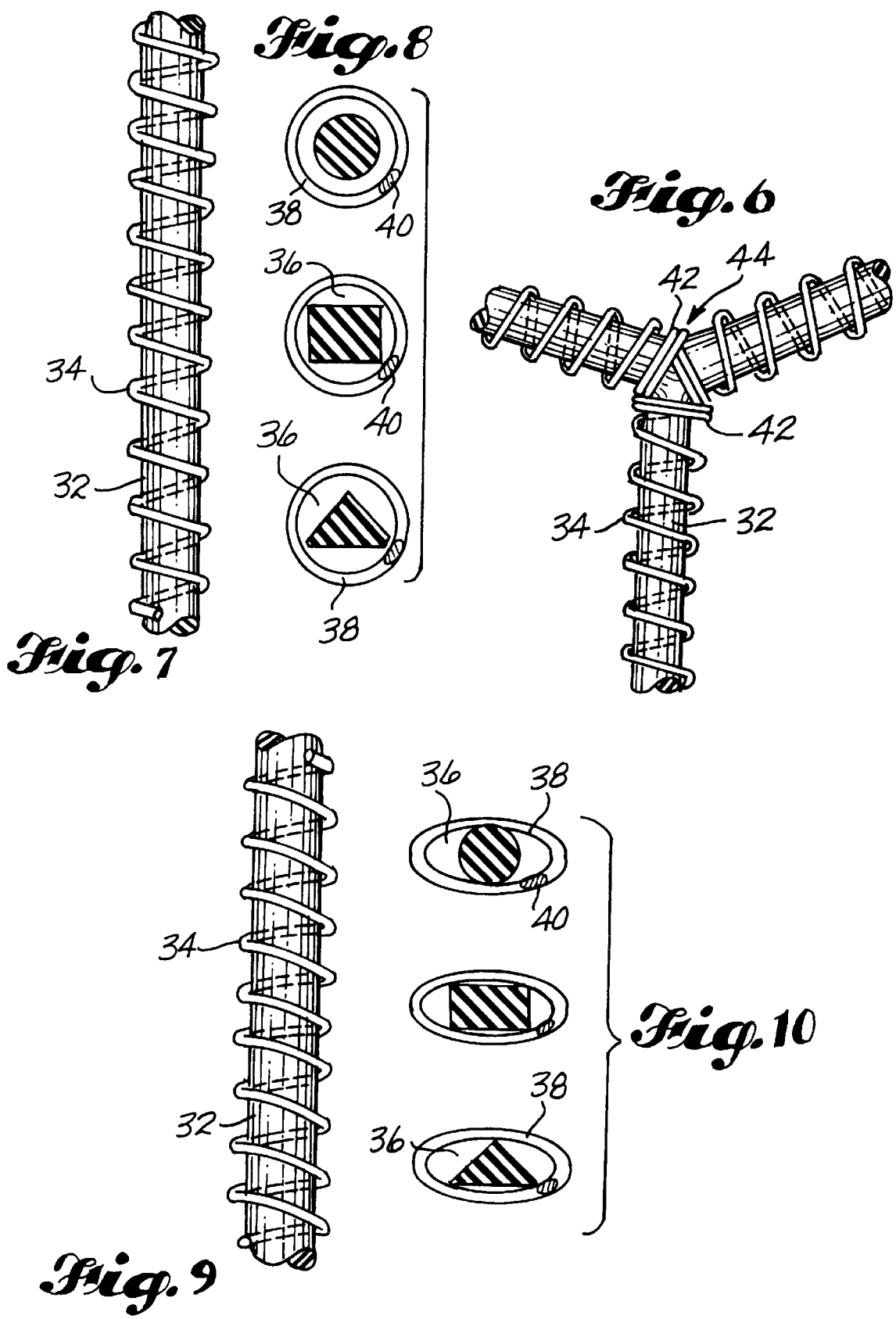

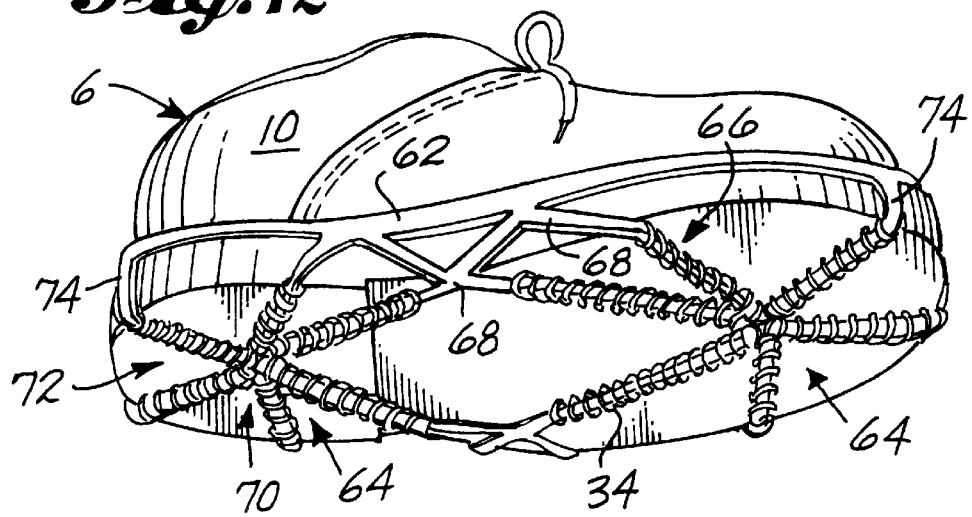
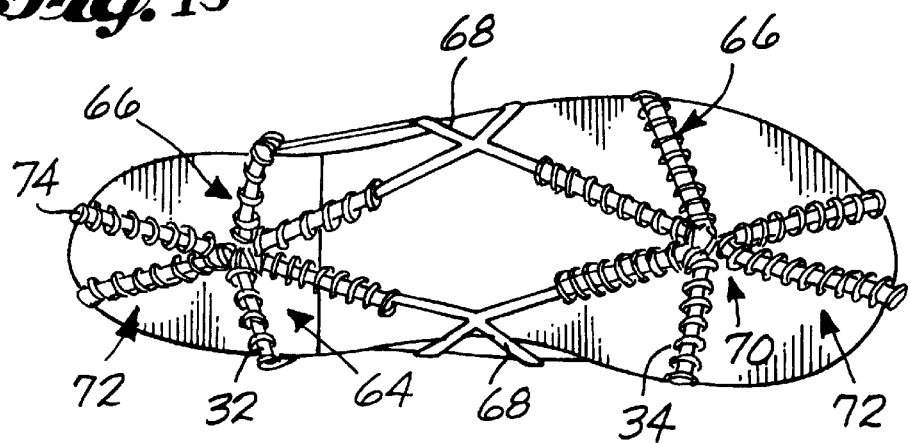
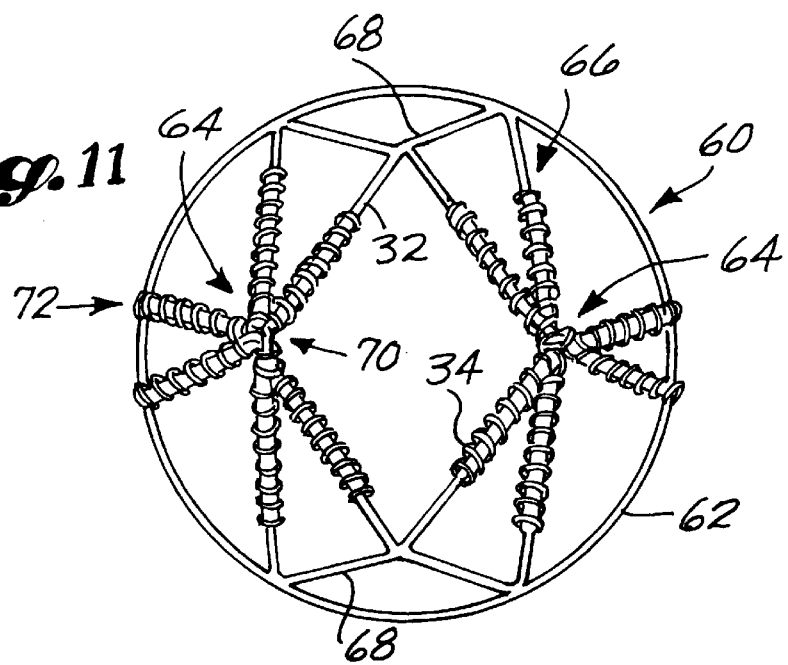

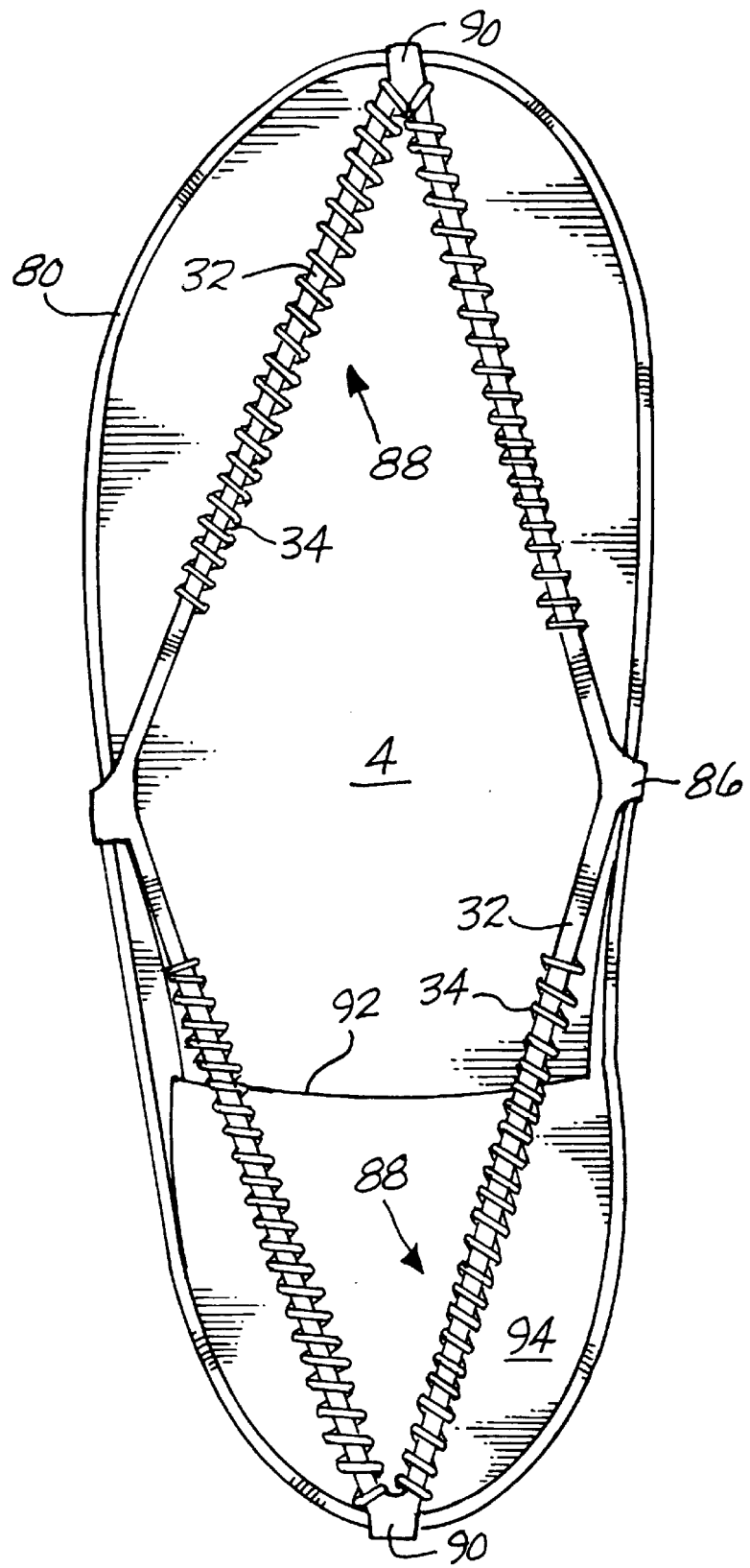

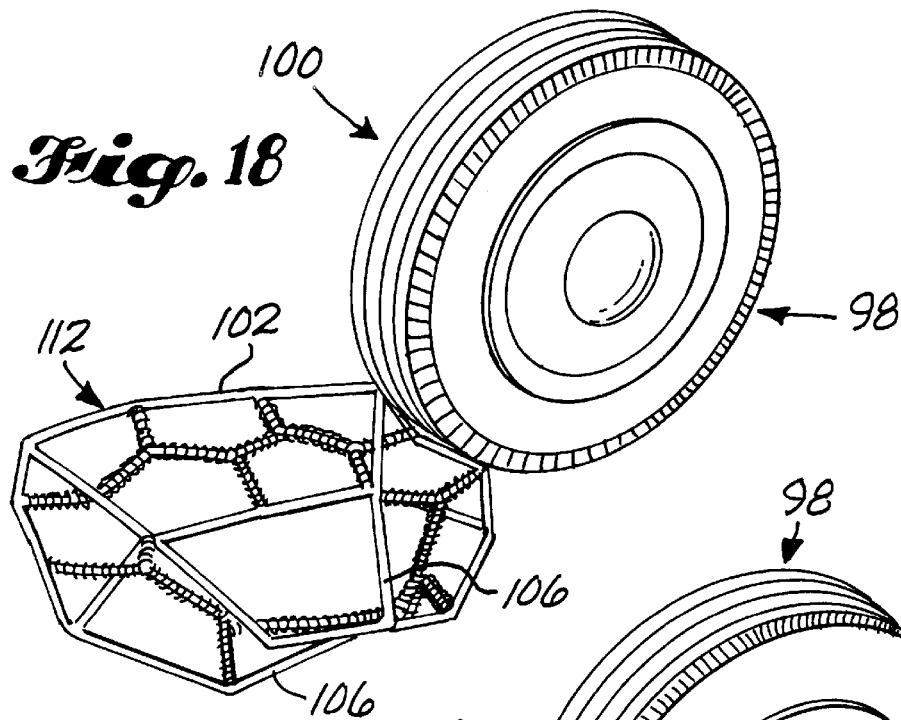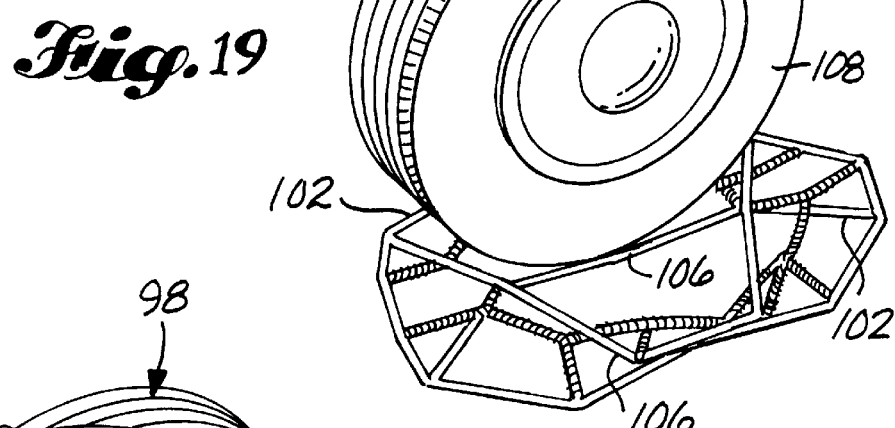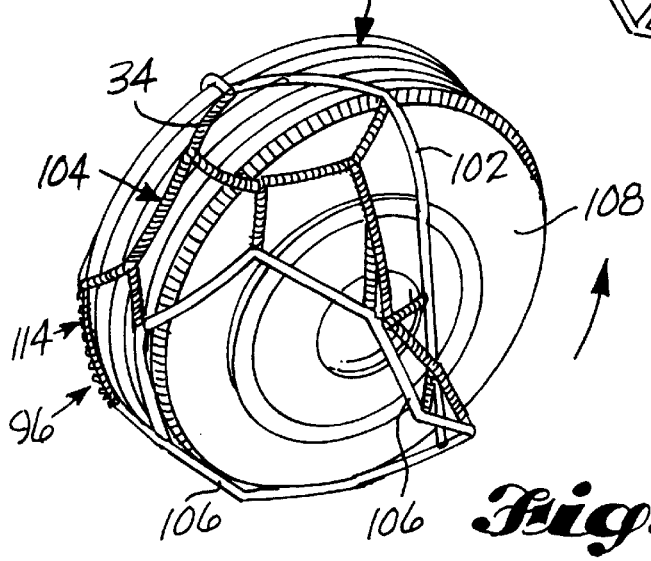

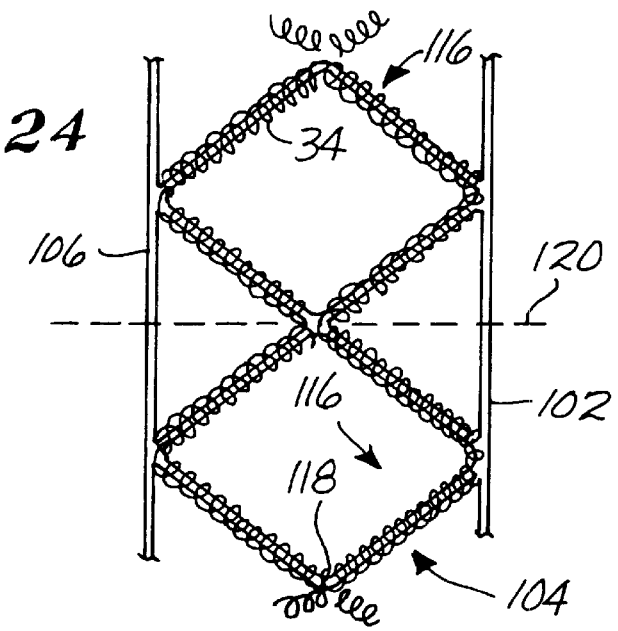
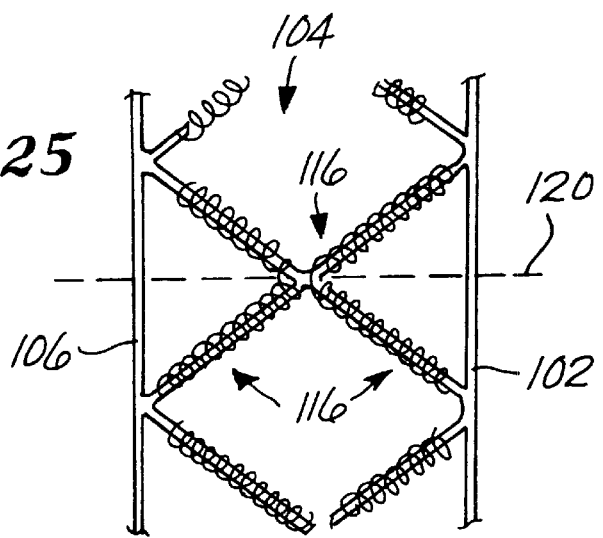
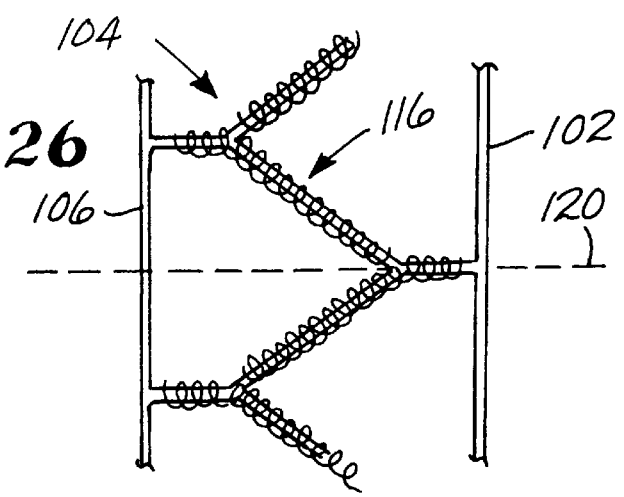

TRACTION AUGMENTATION DEVICE

RELATED APPLICATION

I filed a Provisional Patent Application on Aug. 14, 1995 entitled SCUTE TRACTION DEVICE, and the Application was given Ser. No. 60/002,310. The present Application is a Non Provisional Application corresponding thereto and fully incorporating the Provisional Application herein for the priority and content thereof.

TECHNICAL FIELD

My invention relates to a traction augmentation device for mounting about a movable boss to augment the traction in the footprint of engagement between the boss and an interactive surface thereopposite when the interactive surface drives or is driven by the boss in the movement thereof. The boss may be a generally square or round plate-shaped boss such as a brake pedal in the cab of a vehicle, a generally elongated or oblong plate-shaped boss such as the sole of a shoe, a generally cylindrical wheel-shaped boss such as the ground engaging wheel of a vehicle, or any other structure of similar nature which is operatively engaged with an interactive surface thereopposite, such as a ground surface thereopposite, a machine surface thereopposite, or even the sole of a shoe thereopposite in the case of a brake pedal, to drive or be driven by the surface in the movement thereof. In each instance, the structure, e.g., the boss, is operatively circumposed relatively radially outwardly about an axis of a carrier on which the boss is operatively supported, such as the arm of a brake pedal, the top of a shoe, or the axle of a wheel, and is connected to one end of the carrier so as to have relatively axially inwardly and axially outwardly oriented sides thereon, relative to the carrier. The boss has a central portion thereof which is intrapositioned across the end of the carrier so as to have a face on the axially outwardly oriented side thereof, and an outer peripheral portion thereof which is circumposed about the central portion thereof and has a generally annular surface on the axially inwardly oriented side thereof. In addition, the boss has an outer periphery circumposed about the flange portion thereof which is interposed between the axially inwardly oriented annular surface of the flange portion and the face of the boss.

Depending on its function, the boss will engage the interactive surface at the outer periphery thereof, such as in the case of the wheel of a vehicle, or it will engage the interactive surface at the face thereof, such as in the case of a shoe sole or a brake pedal. Furthermore, the boss and the interactive surface will engage with one another over a so-called "footprint" of engagement therebetween, and accordingly, the inventive traction augmentation device is commonly adapted so that when mounted on the boss, it will operatively interpose traction elements between the boss and the interactive surface over the area of the footprint therebetween.

BACKGROUND OF THE INVENTION

The traction augmentation art is crowded with a wide variety of devices for the purpose. And many of the devices have seen commercial use. Many have also functioned well for the purpose. But all have suffered from the fact that mounting them on the boss has been a cumbersome process, usually involving a plurality of steps, including a step in which two or more components of the device are fastened together to releasably secure the device about the boss. In the so-called "tire chain art" in particular, this has always been a troublesome problem inasmuch as each tire is commonly engaged with a ground surface thereunder, and to mount the device, it is often necessary either to first lift the tire away from that surface, using a jack under the vehicle, or to first interengage the device between the tire and the surface, by driving the vehicle over it, and then to reach around the outer periphery of the tire to the posterior side thereof, to fasten or otherwise secure the device about the tire before the vehicle can be driven away on that tire. Often too, a further adjustment must be made in the device after the vehicle has traveled a predetermined distance, to assure that the device is tightly engaged about the tire and coaxially aligned with the axle of the wheel. Further adjustments may also be needed at a later time to assure that the device remains tightly engaged about the tire, and is still coaxially aligned with the axle of the wheel.

What is needed then is a device which is mountable so simply on the tire, or on some other boss, as to be engageable about the boss from a position opposite the face thereof, without the use of fasteners. What is needed too is a device of this nature which is both self-tightening and self-aligning once it is mounted on a boss, such as through self-adjustment thereon when the boss is moved in engagement with the interactive surface. Furthermore, the device should be something which is engageable about the boss without an undue amount of strength being needed to engage it on the boss; and also something which should be long lasting and durable in use after it is mounted on the boss. Ideally, it should also be quiet and smooth running when in use on a boss, and as quick and simple to remove as it was to mount on the boss. It should also be highly compactible when removed from the boss and placed in storage.

One object of my invention is to provide a traction augmentation device which meets these requirements, and which in particular, is readily mountable from a position opposite the face of the boss without fasteners, and both selftightening and self-aligning on the boss when the boss is moved in relation to an interactive surface thereopposite. In this way, the user need not do any fastening, tightening, or aligning of the device before he or she can initiate movement of the boss. Another object is to provide a device of this nature which can be mounted on the boss in the same fashion as a pair of rubbers is mounted on a pair of shoes to protect them against mud and snow when walking thereon. Anyone who has mounted a pair of rubbers on his or her shoes, knows that each rubber is commonly mounted on one of the shoes by first gripping one section of the rim extending about the top opening of the rubber and hooking it either about the toe or heel of the shoe, and then stretching the remainder of the rubber away from that point until the whole of the rubber opposes the face of the sole of the shoe, and can be slipped axially upwardly about the body of the shoe and then released to snap engage on the shoe and position the traction augmenting portion of the rubber, i.e., the bottom thereof, opposite the face of the sole of the shoe. He or she also knows that some final adjustment may be needed in the positioning of the bottom of the rubber, to bring it into total registry with the face of the sole, but that often in walking about on the rubber and shoe composite, the rubber will actually self adjust on the shoe until the bottom of it is disposed in full registry with the footprint of engagement between the shoe and a ground surface therebelow. This follows from the tendency of the rubber material to shimmy about on the body of the shoe until it has found a state of equilibrium or stability with the shape of the shoe.

Still other objects will become apparent from the disclosure of my invention which follows hereafter.

DISCLOSURE OF THE INVENTION

According to my invention, my traction augmentation device comprises a cowling of resiliently flexible material which is so limp in the normally relaxed state thereof as to be essentially formless, but which when activated for mounting on a boss, can be formed into an elasticized sock for tight fitting engagement about the boss at the outer periphery thereof. At this time, moreover, the sock has an axis for general alignment with the axis of the carrier on which the boss is operatively supported, operatively forward and rearward ends that are spaced apart from one another along the axis of the sock, and an annular rim portion of resiliently flexible material that is circumposed about the axis of the sock at the operatively forward end thereof for engagement with the outer periphery of the boss. The sock also has a continuously uninterrupted loop of resiliently flexible material that is circumposed about the axis of the sock at the operatively forward end thereof, for engagement with the axially inwardly oriented annular surface of the flange portion; and a posterior portion of resiliently flexible material that is circumposed about the axis of the sock at the operatively rearward end thereof, for engagement with the face of the boss. The loop defines an end opening through which the sock can be sleeved about the boss at the outer periphery thereof, but when they are in the normally relaxed state thereof, the loop and the posterior portion of the sock have a diameter at the rim portion thereof, that is so much smaller than the outer periphery of the boss, that the sock can only be sleeved about the outer periphery of the boss by temporarily stretching the loop, rim and posterior portions of the sock in directions transverse the axis thereof, as the sock is passed axially inwardly about the boss and then released to tightly engage about the boss at the outer perphery thereof when the hoop tension in the loop, rim and posterior portions of the sock causes the sock to resume a partially relaxed condition on the boss. Meanwhile, one of the rim and posterior portions of the sock has relatively inner and outer peripheral sides thereon for opposing the boss and the interactive surface, respectively, in the footprint of engagement therebetween; and the one portion comprises a network of elongated strands of resiliently flexible materal which is intrapositioned between the sides of the one portion to lend elasticity to the one portion over an area thereof corresponding to the footprint of engagement between the boss and the interactive surface. But in addition, the one portion of the sock also has an exoskeleton of elongated generally tubular traction generating members thereon, which are sleeved about strands of the resiliently flexible material and have hard durable traction elements on the inner and outer peripheral sides of the one portion, to carapace the network against the abrasive action of the footprint, and at the same time, form a gallery of elongated protective cavities for the strads therewithin, the longitudinal axes of which substantially coincide with the longitudinal axes of the strands, so that the network can flex resiliently within the exoskeleton during the step of sleeving the sock about the boss, and during any subsequent movement of the sock in relation to the boss and the interactive surface at the footprint of engagement therebetween. Given these features, the sock can be virtually snap-engaged on the boss from a position opposite the face thereof, and once engaged on the boss, will not only operatively interpose traction elements between the boss and the interactive thereopposite, but will also self-tighten and self-align on the boss like a rubber on a shoe, when the boss is moved in relation to the interactive surface at the footprint of engagement therebetween. In fact, if desired, the sock may be mounted on the boss like a rubber on a shoe, by gripping one of the angularly successive sections of the loop and the rim portion of the sock that are circumposed about the axis thereof; hooking that one angularly successive section about one of the angularly successive sections of the boss that are circumposed about the outer periphery thereof, so as to engage the one section of the loop with the adjacent portion of the axially inwardly oriented annular surface of the boss; and then stretching the remaining angularly successive sections in the loop and the rim portion of the sock in conjunction with one another, as a resiliently flexible lip of the resiliently flexible material, in the direction relatively away from the respective one angularly successive sections in the rim portion of the sock and the outer periphery of the boss, and relatively toward the remaining angularly successive sections in the outer periphery of the boss, generally transverse the axis of the sock, to stretch the posterior portion of the sock into greater registry with the face of the boss. Then, while the lip is so stretched, it is passed axially inwardly about the remaining angularly successive sections in the outer periphery of the boss, and then released about the boss so that the rim portion of the sock engages with the outer periphery of the boss, when the loop and the rim and posterior portions of the sock resume a partially relaxed state on the boss.

There are many exoskeletons that can be supported on the one portion of the sock to carapace the network against the abrasive action of the footprint and form a gallery of elongated cavities within which the network can flex resiliently during the sleeving of the sock about the boss and any subsequent movement of the sock in relation to the boss and the interactive surface at the footprint of engagement therebetween. But certain exoskeletons also lend themselves better to the sock first assuming and then maintaining coaxial alignment with the axis of the carrier as the boss moves in relation to the interactive surface at the footprint of engagement therebetween. Certain patterns and sub-patterns of strands within the network of the same, also lend themselves better to this effect, but the choice among them, depends in part on whether the boss is a plate-shaped boss or a wheel-shaped boss, and also on whether the plate-shaped boss is elongated in the direction of movement of the boss relative to the interactive surface.

Nevertheless, I should add that in many of the presently preferred embodiments of my invention, the network of elongated strands is loosely sleeved within the gallery of cavities to flex lengthwise and transverse the respective longitudinal axes thereof when the one portion of the sock flexes in the area of the network but the exoskeleton cannot flex in response thereto. In some of these embodiments, moreover, the exoskeleton is resiliently compressible transverse the inner and outer peripheral sides of the one portion of the sock, to absorb compression forces acting between the boss and the interactive surface crosswise the footprint of engagement therebetween. But the exoskeleton is also sufficiently resistant to the forces that the network of strands remains substantially loosely sleeved within the gallery of cavities to flex lengthwise and transverse the longitudinal axes thereof when the one portion of the sock flexes in the area of the network but the exoskeleton cannot flex in response thereto.

In certain of the embodiments, the exoskeleton is responsive to the compression forces to accordion along the longitudinal axes of the cavities at the same time as the exoskeleton compresses transverse the sides of the one portion of the sock. In some embodiments, for example, the traction elements of the exoskeleton are arranged in spaced succession to one another along the longitudinal axes of the cavities, but are interconnected with one another to transfer the compression forces across the spaces therebetween in accordion fashion when the exoskeleton undergoes compression. In fact, in one group of embodiments, the traction elements comprise collars of hard durable but resiliently flexible traction material, which are arranged in spaced tandem array to one another to form elongated cavities therewithin, and are interconnected with one another to form continuous strings thereof in which the respective collars reciprocate or accordion to and fro along the longitudinal axes of the cavities in response to compression forces thereacross.

In one special group of embodiments, the exoskeleton comprises a multiplicity of elongated coils of hard durable traction material which are loosely helically wound about strands of the network so that the longitudinal axes of the coils substantially coincide with the longitudinal axes of the strands and the cylindrical cavities formed within the bores of the respective coils, form the gallery of elongated cavities within the exoskeleton. Meanwhile, the successive part cylindrical turns in the respective coils form series of part annular traction elements that extend in parallel to one another about the respective strands, and collectively, form a protective but resiliently flexible carapace at the inner and outer peripheral sides of the one portion of the sock. The successive part cylindrical turns in the respective coils also form loose-fitting sleeves within which the respective strands of the network can shift to and fro along the axes thereof, and the oblique connections between the part cylindrical turns of the respective coils enable the coils themselves to accordion to and fro along the axes thereof, and particularly when the coils are subjected to compression forces in the area of the footprint. This in turn enables the coils to absorb the forces, while at the same time protecting the network against the abrasive action of the footprint; and given a sufficient crush strength in the material of the respective coils, the compression forces will not deny the network the ability to shift within the exoskeleton.

However, to prevent the coils from "fluttering" along the lengths of the strands and/or "bunching up" at either end of the respective strands, three or more mutually adjacent strands are interconnected with one another to form a juncture thereamong, a pair of the mutually adjacent strands have coils loosely helically wound thereabout, and the ends of the coils disposed adjacent the juncture, are interconnected with one another across the juncture to tether the coils to the network.

In certain of the presently preferred embodiments, the latter mentioned coils are formed by a single elongated coil having the respective end portions thereof loosely helically wound about the respective strands in the pair thereof, and an oblique connection therein intermediate the mutually adjacent endmost turns in the respective end portions of the coil, is wound about the juncture to tether the end portions of the coil to the network.

Preferably, the ends of the coils remote from the juncture, terminate short of the ends of the strands corresponding thereto in the pair of strands. Also, preferably the coils are wound in opposite helical directions about the pair of mutually adjacent strands, in the directions along the respective longitudinal axes thereof relatively toward the juncture.

Preferably too, three or more strands are interconnected with one another in V-shaped formations having their apices at the juncture thereamong. In some embodiments of the invention the V-shaped formations are disposed opposite one another with a single apex therebetween to form an X-shaped sub-pattern of strands having elongated coils loosely helically wound thereabout to form a traction pad within the network at the inner and outer peripheral sides of the one portion of the sock. In other embodiments, a multiplicity of the V-shaped formations is symmetrically angularly oriented about a single apex thereamong, to form a star-shaped sub-pattern of strands, the coils about which once again form a traction pad on the one portion of the sock at the inner and outer peripheral sides thereof. In still other embodiments, four strands are interconnected with one another in V-shaped formations that are oppositely disposed to one another with the ends of the respective strands therein remote from the respective apices thereof, interconnected with one another to form a diamond shaped sub-pattern of strands having coils wound thereabout to form a traction pad within the network at the sides of the one portion.

Where the boss is a plate-shaped boss, the face of which is operatively engaged with an interactive surface thereopposite to drive or be driven by the interactive surface in the movement of the boss, the posterior portion of the sock is commonly intrapositioned across the operatively rearward end of the sock, comprises the network of strands, and has an exoskeleton of the traction elements supported thereon, so that when the sock is sleeved about the boss, the sock forms a muzzle about the boss for augmenting the traction between the face of the boss and an interactive surface thereopposite, at the footprint of engagement therebetween. Also, the rim portion of the sock often comprises a series of resiliently flexible fingers which are generally symmetrically angularly spaced about the axis of the sock to interconnect the network of strands to the loop and engage about the outer periphery of the boss when the sock is sleeved thereabout so that the loop and the posterior portion of the sock engage the axially inwardly oriented annular surface of the flange portion and the face of the sock, respectively, in the partially relaxed condition of the sock.

On the other hand, when the boss is a wheel-shaped boss, the outer periphery of which is operatively engaged with an interactive surface thereopposite to drive or be driven by the interactive surface in the movement of the boss, the rim portion of the sock commonly comprises the network of strands and has an exoskeleton of the traction elements supported thereon, and the posterior portion of the sock is circumposed about the axis of the sock at the operatively rearward end thereof adjacent the rim portion of the sock, so that when the sock is sleeved about the boss, the sock forms an open ended girdle about the boss for augmenting the traction between the outer periphery of the boss and an interactive surface thereopposite, at the footprint of engagement therebetween. Also, the posterior portion of the sock often takes the form of a second continuously uninterrupted loop of resiliently flexible material that engages the face of the boss in an annulus substantially axially opposed to the first mentioned loop of the sock, so that the sock is generally circumferentially balanced about the operatively forward and rearward ends thereof when the sock is sleeved about the boss with the first and second mentioned loops thereof engaged with the axially inwardly oriented annular surface of the flange portion and the face of the sock, respectively, in the partially relaxed condition of the sock.

Where the boss is a plate-shaped boss which is transversely elongated in the direction of movement thereof, and the strands in the network are interconnected with one another in V-shaped formations having apices at the junctures therebetween, the formations are commonly oriented in the network so that the apices thereof point in a direction parallel to the lengthwise dimension of the boss, when the sock is sleeved thereabout.

Where the boss is a wheel-shaped boss, and the strands in the network are interconnected with one another in V-shaped formations having apices at the junctures therebetween, the formations may be oriented in the network so that the apices thereof point in a direction crosswise the axis of the carrier and circumferentially of the boss, or they may be oriented in the network so that the apices thereof point in a direction parallel to the axis of the carrier, when the sock is sleeved about the boss.

Where the pairs of strands in the respective V-shaped formations mentioned above, have elongated coils loosely helically wound thereabout, the coils are preferably wound in opposite helical directions to one another, in the directions relatively toward the apices of the respective formations, so that the traction is generated in the direction of movement of the boss.

BRIEF DESCRIPTION OF THE DRAWINGS

These features will be better understood by reference to the accompanying drawings wherein I have illustrated several coil equipped muzzle-forming versions of my device, and one of the coil equipped girdle-forming versions of it.

In the drawings:

FIG. 1 is a plan view of the cowling of a coil equipped muzzle-forming version of the device that is adapted for mounting on the sole of a shoe having a welt thereabout, and shown as though laid out and pressed flat on a supporting surface therebelow;

FIG. 2 is a side elevational view of such a shoe when the cowling has been activated for mounting on the sole of the shoe, formed into an elasticized sock for stretching about the sole of the shoe, and then engaged on the sole as shown;

FIG. 3 is a plan view of the face of the sole when the sock has been engaged thereon as in FIG. 2;

FIG. 4 is a perspective view of the sole of a shoe when a similar but slightly modified cowling has been activated and formed into an elasticized sock, and the sock is being stretched about the sole of the shoe, by the technique that was mentioned hereinbefore as similar to that used in mounting a rubber on a shoe;

FIG. 5 is a perspective view of the sole of the shoe when the sock in FIG. 4 has been engaged on the sole;

FIG. 6 is a greatly enlarged and simplified representation of a juncture in a network of elongated strands of the type used in FIGS. 1–5, at the posterior portion of the sock, and having an exoskeleton of elongated coils loosely helically wound about the strands thereof, with those ends of the coils mutually adjacent one another at the juncture, being intertwined with one another at the juncture to tether the respective coils to the network of strands;

FIG. 7 is an enlarged view of one strand of the network, and the coil loosely helically wound thereabout, as the strand and coil would appear in the network after the sock has engaged on the sole of a shoe, but before the coil has been placed under any compression;

FIG. 8 is a representation of several cross sections that the strands may have in the network of the socks seen in FIGS. 1–5;

FIG. 9 is a view similar to FIG. 7, but after the coil has been placed under compression in the use of the sock on the sole, and accordingly, the turns of the coil have taken on an elliptical cross section transverse the longitudinal axis of the coil;

FIG. 10 is a representation similar to FIG. 8, but now showing the coil under compression as in FIG. 9;

FIG. 11 is the cowling of another coil equipped muzzle-forming version of the device, and again as though laid out on a supporting surface not shown in the Figure;

FIG. 12 is a perspective view of the sole of a shoe when the cowling in FIG. 11 has been activated and formed into an elasticized sock, and the sock has been engaged on the sole;

FIG. 13 is a plan view of the face of the sole when the sock in FIGS. 11 and 12 has been engaged thereon;

FIG. 14 is a greatly enlarged view of a juncture in the network of the sock in FIGS. 11–13;

FIG. 15 is a perspective view of still another muzzle-forming version wherein, when supported, the cowling thereof is somewhat slipper-shaped in the normally relaxed condition thereof and the network in the posterior portion of the resulting slipper-shaped sock has a diamond-shaped pattern in which the opposing V-shaped formations thereof have elongated coils loosely helically wound thereabout that are tethered to the network only at the apices of the formations, so that the sock is more stretchable lengthwise thereof for mounting on shoes having soles of differing lengths;

FIG. 16 is a plan view of the face of the sole when the sock in FIGS. 14 and 15 has been engaged thereon;

FIG. 17 is a plan view of the face of the sole of a shoe having a greater length than that of FIG. 16, and showing the manner in which the slipper-shaped sock has stretched to accommodate to the greater length of the sole;

FIG. 18 is the first of several perspective views of a coil equipped girdle-forming version of the device, and the first illustrating the steps which can be used in mounting it on a ground engaging wheel from a position opposite the face thereof;

FIG. 19 is the second in the series and shows a second step in the mounting of the girdle-forming version on the wheel;

FIG. 20 is a third such view and shows a third step in the mounting of the girdle-forming version on the wheel;

FIG. 24 is a schematic representation of one pattern of strands which can be employed in the network of the sock in the girdle-forming version, FIG. 25 is a schematic representation of another pattern which can be employed in the network of the sock in the muzzle-forming version; and FIG. 26 is still another schematic representation of a third pattern which can be employed in the network of the sock in the girdle-forming version.

BEST MODE FOR CARRYING OUT THE INVENTION

Figure 21:
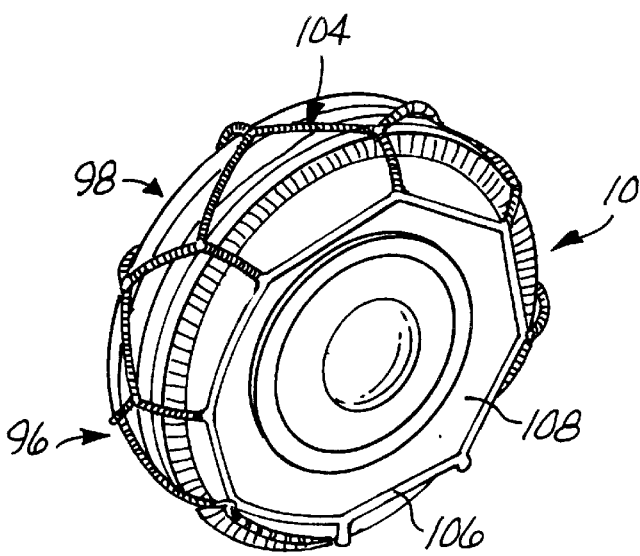
FIG. 21 is a fourth in the series and shows the girdle-forming version engaged on the wheel.
Figure 23:
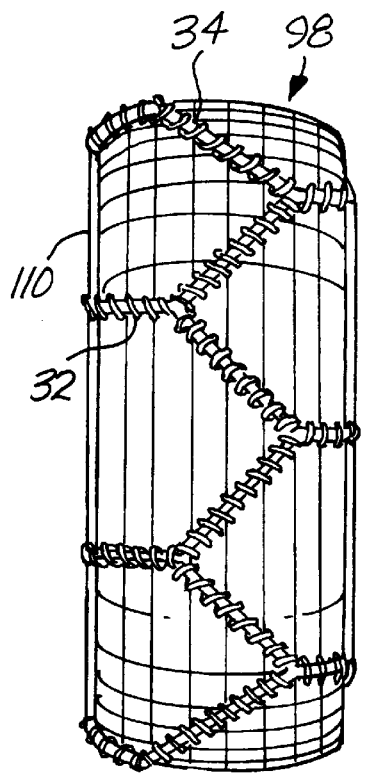
FIG. 23 is an end elevational view of the wheel with the coil equipped girdle-forming version engaged thereon.
Figure 22:
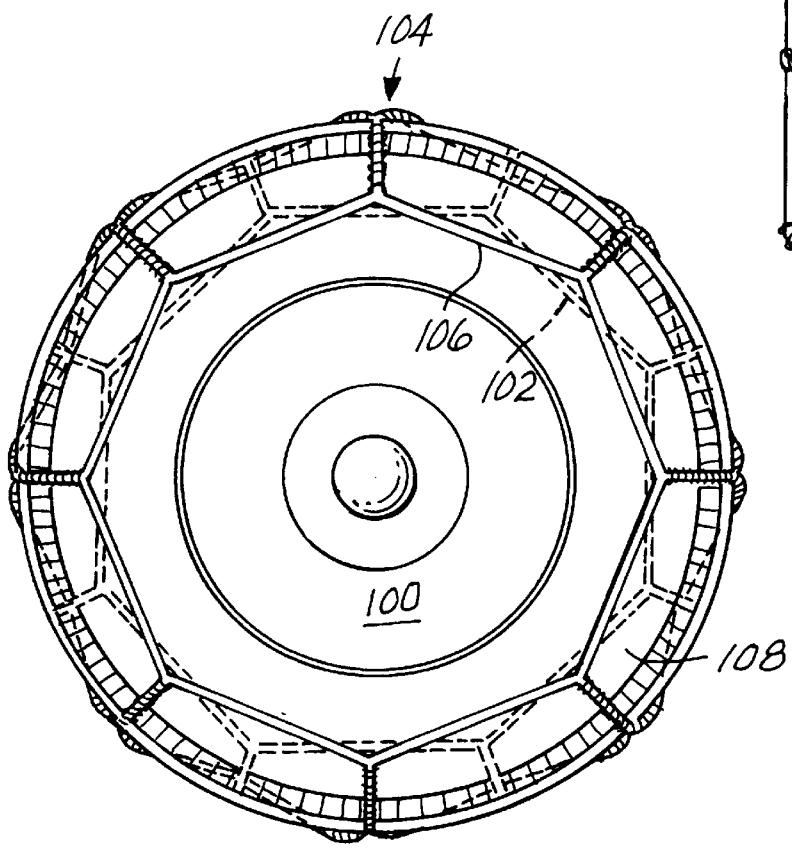
FIG. 22 is a side elevational view of the wheel with the coil equipped girdle-forming version engaged thereon.

Referring first to FIGS. 1–3, it will be seen that considered as a whole, including the welt 2 thereof, the sole 4 of the shoe 6 constitutes a plate-shaped boss which is circumposed relatively radially outwardly about the generally upright axis 8 of the shoe top 10 from which the sole of the shoe is supported. The sole is also oblong in the dimensions thereof crosswise of the axis and is connected to the bottom of the shoe top 10 so as to have relatively axially upwardly and axially downwardly oriented sides thereon. Moreover, the sole has a central portion 12 thereof which is intrapositioned across the bottom of the shoe top so as to have an axially downwardly oriented face 14 on the axially downwardly oriented side thereof; and in addition, an outer peripheral flange portion 2 at the welt thereof, which is circumposed about the central portion 12 thereof and has a generally upwardly oriented annular surface 16 on the axially upwardly oriented side of the sole. In addition, the sole also has an outer periphery 18 circumposed about the flange portion or welt 2 thereof, which is interposed between the upwardly oriented annular surface 16 of the flange portion 2 and the face 14 of the sole.

The coil equipped muzzle-forming version of my device seen in FIGS. 1–3, comprises a cowling 20 of elastomer material which is so limp in the normally relaxed state thereof as to be essentially formless. Such would be the case, for example, were the cowling seen in FIG. 1 lifted in one hand from the supporting surface (not shown) for the same. However, when my device is activated for mounting on the sole 4 of a shoe 6, and the cowling 20 is lifted with two hands, it can be formed into an elasticized sock 22 for tight fitting engagement about the sole of the shoe at the outer periphery 18 thereof. See FIGS. 2 and 3. At this time, moreover, the sock 22 has an axis 24 for general alignment with the axis 8 of the shoe top 10, operatively forward and rearward ends, i.e. upper and lower ends, that are spaced apart from one another along the axis of the sock and an annular rim portion 26 of the elastomer material that will be described more fully hereinafter and is circumposed about the axis 24 of the sock at the operatively forward or upper end thereof for engagement with the outer periphery 18 of the sole. The sock 22 also has a continuously uninterrupted loop 28 of the elastomer material that is circumposed about the axis of the sock at the operatively forward or upper end thereof, for engagement with the axially upwardly oriented annular surface 16 on the flange portion or welt 2 of the sole. And lastly, the sock has a posterior portion 30 of the elastomer material that will also be described more fully hereinafter and is intrapositioned across the operatively rearward or lower end of the sock, for engagement with the face 14 of the sole.

The loop 28 defines an end opening through which the sock can be sleeved about the sole 4 at the outer periphery 18 thereof, but when they are in the normally relaxed state thereof, the loop 28 and the posterior portion 30 of the sock have a diameter at the rim portion 26 thereof, that is so much smaller than the outer periphery 18 of the sole, that the sock 22 can only be sleeved about the outer periphery of the sole by temporarily stretching the loop, the rim and the posterior portions of the sock in directions transverse the axis 24 thereof, as the sock is passed axially upwardly about the sole and then released to tightly engage about the sole at the outer periphery thereof when the hoop tension in the loop, rim and posterior portions of the sock causes the sock to resume a partially relaxed condition on the sole.

Of course, the shoe is intended for walking on an interactive surface thereopposite (not shown), i.e., a walking surface; and that being the case, the posterior portion 30 of the sock has relatively inner and outer peripheral sides thereon for opposing the sole 4 of the shoe and the walking surface, respectively, in the footprint of engagement therebetween. And in accordance with my invention, the posterior portion comprises a network of elongated strands 32 of the elastomer material, which is intrapositioned between the sides of the posterior portion 30 to lend elasticity to that portion over an area thereof corresponding to the footprint of engagement between the sole and the walking surface. But in addition, the posterior portion also has an exoskeleton supported thereon comprised of a multiplicity of elongated resiliently flexible coils 34 of carbon steel or other hard durable traction material which are loosely helically wound about strands 32 of the network so that the longitudinal axes of the coils substantially coincide with the longitudinal axes of the strands. In this way, the coils are resiliently flexibly arrayed about the strands 32 at the inner and outer peripheral sides of the posterior portion, to carapace the network against the abrasive action of the footprint, and at the same time, to form a gallery of elongated cavities 36 (FIGS. 8 and 10) within which the strands 32 can flex, i.e., the cylindrical cavities 36 formed by the bores of the respective coils 34. Since the longitudinal axes of the cavities substantially coincide with the longitudinal axes of the strands, and the network of strands is loosely sleeved within the gallery of cavities, the network can flex resiliently within the exoskeleton formed by the coils not only during the step of sleeving the sock about the sole, but also during any subsequent movement of the sock in relation to the sole and the walking surface, at the footprint of engagement therebetween, when the exoskeleton may be momentarily clamped between the two.

The exoskeleton is also resiliently compressible transverse the inner and outer peripheral sides of the posterior portion, to absorb any compression forces acting between the sole and the walking surface crosswise the footprint of engagement therebetween. See FIGS. 9 and 10 wherein when momentarily clamped between the sole and the walking surface, the part cylindrical turns 38 (FIGS. 8 and 10) of the coils have taken on an elliptical cross section about the strands corresponding thereto. However, the exoskeleton should be sufficiently resistant to the compression forces that the network of strands remains substantially loosely sleeved within the gallery of cavities 36 to flex lengthwise and transverse the longitudinal axes thereof when the posterior portion 30 of the sock 22 flexes in the area of the footprint and the exoskeleton cannot flex in response thereto.

The exoskeleton absorbs the compression in large part by the fact that the successive turns 38 of the coils are responsive to the compression forces to accordion along the longitudinal axes of the cavities at the same time as the exoskeleton undergoes compression transverse the sides of the posterior portion of the sock. That is, the part cylindrical turns of the coils are arranged in spaced succession to one another along the axes of the cavities, but are interconnected with one another by oblique connections 40 therebetween to transfer the compression forces across the spaces therebetween in accordion fashion when the exoskeleton undergoes compression.

FIGS. 7–10 also illustrate the fact that the strands 32 of elastomer material may have any one of various cross sections, such as the cylindrical, polygonal, and triangular cross sections illustrated in FIGS. 8 and 10.

To tether the coils 34 to the network, ends 42 (FIG. 6) of the coils disposed adjacent the junctures 44 among three or more mutually adjacent strands 32, are interconnected with one another across the junctures, as seen in FIGS. 1, 3 and 6. See FIG. 6 in particular, wherein the ends 42 of the coils are intertwined with one another to tether each of them to the juncture 44.

The strands in the network of FIGS. 1–3 are crisscrossed with one another in a pattern comprised of X-shaped sub-patterns 46 which are arrayed in tandem with one another along the lengthwise dimension of the posterior portion, to correspond with the direction of translatory motion of the shoe when walking on a surface thereopposite. Given the exoskeleton of coils around the respective strands of the sub-patterns, the sub-patterns form traction pads on the face of the sole to aid in the translatory motion of the shoe on the surface. Meanwhile, the fingers 48 at the outlying ends of the strands midway the sides of the pattern, are interconnected with one another in V-shaped formations, to interconnect the pads with the sides of the loop 28, and the fingers 50 at the opposing end portions of the pattern are I-shaped only, to interconnect the remaining strands of the pads with the respective end portions of the loop 28 thereadjacent. When the sock is sleeved about the sole of the shoe, the respective fingers 48 and 50 wrap about the periphery 18 of the sole and grip the same as the sock takes on the form of a muzzle for the sole. As such, the fingers serve as the rim portion of the sock.

The muzzle-forming version seen in FIGS. 1–3 is operative for the purposes of my invention, but has several drawbacks which are eliminated by the other versions of it to be described shortly. For one, the loop 28 is preferably monolithic, rather than in several sections joined at welds therebetween, as seen at 52 in FIG. 1. Moreover, the loop 28 is preferably circular, rather than oblong with V-shaped fore and aft portions, as seen in FIG. 1. In this way, the loop will be prone to relax more evenly about the welt under the hoop tension therein, when the sock is sleeved about a sole. Thirdly, the pattern of the network is preferably devoid of any additional strand, such as that seen at 54 in FIG. 1, running lengthwise the pattern of the network and interconnecting it with the toe and heel of the loop. This additional strand 54 has a tendency to restrict the stretchability of the sock transverse the axis 24 thereof, when the sock is sleeved about the sole in the mounting of it on the sole. But more importantly, the ends of the coils remote from the sub-patterns, that is, those approaching the fingers of the sock, are terminated short of the fingers, rather than wound about the fingers and connected with the loop, as seen at 56 in FIG. 3. Preferably, the coils are also interconnected with the junctures in a manner to enable them to range more freely from the junctures, in the accordion-like movement of the turns therewithin, even though they remain tethered to the junctures, as shall be explained more fully hereinafter. And lastly, the coils in each V-shaped formation of the respective sub-patterns, are preferably wound in opposite helical directions form one another about the strands thereof, in the directions relatively toward the junctures of the sub-patterns, as shall also be explained more fully hereinafter.

FIGS. 4 and 5 illustrate a technique by which the sock may be sleeved about the sole 4 of a shoe, much as a rubber is mounted on a shoe. Initially, the angularly successive section of the loop 28 at the toe of the sock is gripped in one hand and hooked about the angularly successive section of the toe of the welt 2, so as to engage the section of the loop with the adjacent portion of the axially upwardly oriented annular surface 16 on the welt. Then, the remaining angularly successive sections in the loop 28 and the rim portion 30 of the sock are stretched in conjunction with one another, as a resiliently flexible lip 58 of the elastomer material, and in the direction relatively away from the point at which the toe of the rim portion of the sock is hooked about the outer periphery of the toe of the welt, and transverse the axis 24 of the sock. This stretches the posterior portion 30 of the sock into greater registry with the face 14 of the sole, as seen in FIG. 4, and while the lip 58 is so stretched, it is passed axially upwardly about the remainder of the outer periphery 18 of the sole, and then released about the sole so that the fingers 48 and 50 of the sock engage with the outer periphery of the sole when the loop 28 and the rim and posterior portions 26 and 30 of the sock resume a partially relaxed state on the sole.

FIG. 11 shows a cowling 60 from which one of the more preferred muzzle-forming socks of my invention can be formed for sleeving about the sole of a shoe. The loop 62 is circular, monolithic, and encompasses a network in which the strands 32 are interconnected with one another to form star-shaped sub-patterns 64 that can be arrayed in tandem with one another lengthwise the sole of the shoe. The strands 32 making up the sidewise V-shaped formations 66 of the sub-patterns, are interconnected with the loop 62, moreover, by pairs of V-shaped fingers 68 at those ends of the formations remote from the junctures 70 of the sub-patterns; whereas the V-shaped formations 72 of the sub-patterns at the toe and heel of the sock are interconnected with the loop by I-shaped fingers 74 at those ends of the formations remote from the junctures. In this way, the toe and heel of the sock engage the outer periphery 18 of the sole at either side of the toe and heel thereof, whereas the sides of the sock have more heavily reinforced fingers 68 thereon to counter any side slippage in the sock at the footprint of engagement between the sole and the walking surface therebelow. The coils 34 wound about the sub-patterns 64, are tethered only to the junctures 70 thereof, and as seen in FIG. 14, are formed in each V-shaped formation by a single coil 76 having the respective end portions thereof loosely helically wound about the respective strands 32 in the formation, as represented by the arrows 78, and an oblique connection 40 (FIGS. 8 and 10) therein intermediate the mutually adjacent endmost turns in the respective end portions of the coil, wound about the adjacent juncture 70 to tether the end portions to the network. Meanwhile, the ends of the coil remote from the juncture 70, terminate short of the ends of the strands corresponding thereto in the formation, so that the fingers 68 and 74 therebeyond are uncoiled as they wrap about the outer periphery of the sole to form the rim portion of the sock. Furthermore, the endmost portions of the coil in each V-shaped formation are wound in opposite helical directions about the pair of strands, in the directions relatively toward the juncture 70 at the apex of the respective formation. In this way, any lateral and/or endwise displacement forces, i.e., side slippage, arising in the area of the footprint between the sole and the surface therebelow, are effectively neutralized as the forces confront the oppositely wound turns of the formations.

FIGS. 15–17 illustrate another departure from FIGS. 1–3. In this instance, the loop 80 has an effective diameter approximating that of the periphery of the posterior portion 82 of the sock 84, so that the loop 80 effectively registers with the periphery of the posterior portion, and the fingers 86 upstand between the two, to form a somewhat slipper-shaped sock, even when the sock is in the relatively limp unactivated cowling stage of its existence. The network of strands 32 is also in the form of a diamond-shaped pattern, the mutually opposing V-shaped formations 88 of which have their apices at the toe and heel of the sock, and the coils 34 in the exoskeleton of which are tethered only to the junctures 90 at those apices. As a result, the sock 84 is more stretchable in the lengthwise direction thereof, to enable it to be mounted on soles 4 of differing lengths. Compare FIG. 16, on one hand, wherein the V-shaped formations 88 are relatively unstretched, so that the coils 34 approach the fingers 86 midway of the sock, and FIG. 17, on the other hand, wherein the formations 88 have been drawn apart somewhat by the greater length of the sole 4, but the coils 34 have provided no deterrent to this effect in that they are tethered only to the toe and heel of the sock.

The sock 84 in FIGS. 15–17 also takes into account the fact that the instep 92 formed by the raised heel 94 of a shoe, provides a recess in which the network of strands 32 is somewhat protected from the abrasive action of the footprint, even when the coils 34 are retracted from the midsection of the sock, as shown in FIG. 17.

FIGS. 18–23 show a coil equipped girdle-forming version of my device, and a sequence of steps by which the sock 96 of the device can be sleeved about the outer periphery or tire 98 of a ground engaging wheel 100, even while the wheel remains in engagement with the ground. As in the case of the respective muzzle-forming versions for plate-shaped bosses, such as shoe soles, the sock 96 comprises a loop 102, a rim portion 104, and a posterior portion 106, but in this instance, the rim portion 104 comprises the network of strands 32 and has an exoskeleton of coils 34 supported thereon, whereas the posterior portion 106 of the sock is circumposed about the axis of the sock at the operatively rearward end thereof, adjacent the rim portion 104 of the sock. In this way, when sleeved about the tire 98 of the wheel, the sock 96 forms an open ended girdle for augmenting the traction between the tire and a ground surface (not marked as such) therebelow, at the footprint of engagement between the two. Also in this instance, the posterior portion 106 of the sock takes the form of a second continuously uninterrupted outside loop of the elastomer material, and this outside loop 106 engages the face, i.e., the axially outwardly oriented sidewall 108 of the tire of the wheel, in an annulus substantially opposed to the first mentioned inside loop 102 of the sock, so that the sock 96 is generally circumferentially balanced about the operatively forward and rearward ends thereof when the sock is sleeved about the wheel with the inside and outside loops 102 and 106 thereof engaged with the axially inwardly oriented sidewall 110 (FIG. 32) of the tire, and the axially outwardly oriented sidewall 108 of the tire, respectively, in the partially relaxed condition of the sock.

As for the technique for mounting the sock while the wheel 100 remains in engagement with a ground surface therebelow, the first step is to form the cowling 112 of the sock into a pile on the ground in which the bottoms of the loops 102 and 106 are disposed at the bottom of the pile, and the bottom of the inside loop 102 is disposed so that it will be at the inside of the tire 98 when the tire is driven over the pile, as in FIG. 19. to make a footprint of engagement between the tire and the surface at a point within the pile. Meanwhile, the bottom of the outside loop 106 is laid outside of the footprint, and the remainder of the outside loop and the rim portion 104 are folded relatively away from the site of the bottom of the inside loop 102 and in the direction of the site of the bottom of the outside loop 106, so that the remainder lies crosswise the footprint, but outside of the footprint itself in the direction of travel of the wheel. See FIG. 19 once again. Then after the wheel 100 has been driven over the pile to register with the footprint, as in FIG. 19. the remainder of the rim portion 104 and the respective loops 102, 106 can be lifted away from the ground surface as a resiliently flexible lip 114 of the elastomer material, and stretched crosswise the axis of the sock, to pass the sock axially inwardly of the tire and form a girdle thereon in the manner of FIG. 20, using the footprint of engagement as the hook point for the sock, reminiscent of the technique used in mounting a sock for a shoe sole in FIGS. 1–17. The fully engaged result is seen in FIGS. 21, and when the tire 100 is thereafter driven away from the site of the pile, the sock will seek a condition of coaxial alignment with the wheel, and at the same time, self-tighten about the tire to seek a condition in which both loops 102, 106 are circumferentially balanced about the tire at the sidewalls 108, 110 thereof.

Several patterns are preferred for the network of strands 32 in the rim portion 104 of the sock. In addition to that seen in FIG. 23, those seen in FIGS. 24–26 provide other options in which the V-shaped formations 116 of the respective sub-patterns of the network, have coils 34 thereon made up from a single coil 76 (FIG. 14), the end portions of which provide the coils for the respective strands of the sub-patterns, and an intermediate oblique connection 40 (FIGS. 8 and 10) of which provides a tether for the end portions at the apex or juncture 118 of each formation.

In FIG. 24, the apices 118 of the respective V-shaped formations point in a direction crosswise the axis 120 of the sock and circumferentially thereof. In FIG. 25, they point in a direction parallel to the axis. And in FIG. 26, they point again crosswise of the axis, but at oblique angles thereto, first in one direction of the axis and then in the other, and in Y-shaped sub-patterns, rather than the X-shaped sub-patterns of FIGS. 23 and 24.

I claim:

1. A traction augmentation device for mounting about a movable boss to augment the traction in the footprint of engagement between the boss and an interactive surface thereopposite when the interactive surface drives or is driven by the boss in the movement thereof, the boss being operatively circumposed relatively radially outwardly about an axis of a carrier on which the boss is operatively supported, and connected to one end of the carrier so as to have relatively axially inwardly and axially outwardly oriented sides thereon, relative to the carrier, and the boss having a central portion thereof which is intrapositioned across the end of the carrier so as to have a face on the axially outwardly oriented side thereof, an outer peripheral flange portion thereof which is circumposed about the central portion thereof and has a generally annular surface on the axially inwardly oriented side thereof, and an outer periphery circumposed about the flange portion thereof that is interposed between the axially inwardly oriented annular surface of the flange portion and the face of the boss, the traction augmentation device comprising:
a cowling of resiliently flexible material which is so limp in the normally relaxed state thereof as to be essentially formless, but which when activated for mounting on the boss, can be formed into an elasticized sock for tight fitting engagement about the boss at the outer periphery thereof, the sock having an axis for general alignment with the axis of the carrier, operatively forward and rearward ends that are spaced apart from one another along the axis of the sock, an annular rim portion of resiliently flexible material that is circumposed about the axis of the sock at the operatively forward end thereof for engagement with the outer periphery of the boss, a continuously uninterrupted loop of resiliently flexible material that is circumposed about the axis of the sock at the operatively forward end thereof for engagement with the axially inwardly oriented annular surface of the flange portion, and a posterior portion of resiliently flexible material that is circumposed about the axis of the sock at the operatively rearward end thereof for engagement with the face of the boss, the loop defining an end opening through which the sock can be sleeved about the boss at the outer periphery thereof, but when in the normally relaxed state thereof, the loop and posterior portion of the sock having a diameter at the rim portion thereof, that is so much smaller than the outer periphery of the boss, that the sock can only be sleeved about the outer periphery of the boss by temporarily stretching the loop, rim and posterior portions of the sock in directions transverse the axis thereof, as the sock is passed axially inwardly about the boss and then released to tightly engage about the boss at the outer periphery thereof when the hoop tension in the loop, rim and posterior portions of the sock causes the sock to resume a partially relaxed condition on the boss, one of the rim and posterior portions of the sock having relatively inner and outer peripheral sides thereon for opposing the boss and the interactive surface, respectively, in the footprint of engagement therebetween, and comprising a plurality of elongated strands of resiliently flexible material which have oppositely disposed end portions and are interconnected with one another at junctures between adjacent end portions of adjacent strands to form a network of the material which is intrapositioned between the sides of the one portion to lend elasticity to the one portion over an area thereof corresponding to the footprint of engagement between the boss and the interactive surface, the network having an exoskeleton of elongated generally tubular traction generating members sleeved about strands of the resiliently flexible material therein, the respective traction generating members being generally coextensive with the respective strands corresponding thereto in the area of the one portion corresponding to the footprint of engagement, and having oppositely disposed end portions and hi durable traction elements on the respective inner and outer peripheral sides of the one portion of the sock to carapace the network against the abrasive action of the footprint both from the boss and from the interactive surface thercopposite, and each of the respective traction generating members being resiliently flexible and having one end portion thereof connected to the network at an adjacent juncture therein, but the other end portion of each traction generating member being detachedly spaced apart from the junctures of the network, and the traction generating members being so loosely engaged about the respective strands of resiliently flexible material corresponding thereto that the network can flex resiliently within the exoskeleton during the step of sleeving the sock about the boss, and during any subsequent movement of the sock in relation to the boss and the interactive surface at the footprint of engagement therebetween.

2. The traction augmentation device according to claim 1 wherein the network of elongated strands is loosely sleeved within the plurality of traction generating members to flex lengthwise and transverse the respective longitudinal axes thereof when the one portion of the sock flexes in the area of the network and the exoskeleton cannot flex in response thereto.

3. The traction augmentation device according to claim 2 wherein the exoskeleton is resiliently compressible transverse the inner and outer peripheral sides of the one portion of the sock, to absorb any compression forces acting between the boss and the interactive surface crosswise the footprint of engagement therebetween, but the exoskeleton is also sufficiently resistant to the forces that the network of strands remains substantially loosely sleeved within the traction generating members corresponding thereto to flex lengthwise and transverse the longitudinal axes thereof when the one portion of the sock flexes in the area of the network and the exoskeleton cannot flex in response thereto.

4. The traction augmentation device according to claim 3 wherein the exoskeleton is responsive to the compression forces to accordion along the longitudinal axes of the strands of resiliently flexible material at the same time as the exoskeleton compresses transverse the sides of the one portion of the sock.

5. The traction augmentation device according to claim 3 wherein the traction elements are arranged in spaced succession to one another along the longitudinal axes of the traction generating members, but are interconnected with one another to transfer the compression forces across the spaces therebetween in accordion fashion when the exoskeleton undergoes compression.

6. The traction augmentation device according to claim 5 wherein the traction elements comprise collars of resiliently flexible traction material, which are arranged in spaced tandem array to one another to form elongated cavities therewithin, and are interconnected to one another to form continuous strings thereof in which the respective collars accordion to and fro along the longitudinal axes of the cavities in response to compression forces thereacross.

7. The traction augmentation device according to claim 1 wherein the exoskeleton comprises a multiplicity of elongated resiliently flexible coils of hard durable traction material which are loosely helically wound about strands of the network so that the longitudinal axes of the coils substantially coincide with the longitudinal axes of the strands.

8. The traction augmentation device according to claim 7 wherein three or more mutually adjacent strands are interconnected with one another to form a juncture thereamong, a pair of the mutually adjacent strands have coils loosely helically wound thereabout, and the ends of the coils disposed adjacent the juncture, are interconnected with one another across the juncture to tether the coils to the network.

9. The traction augmentation device according to claim 8 wherein the latter mentioned coils are formed by a single elongated coil having the respective end portions thereof loosely helically wound about the respective strands in the pair thereof, and an oblique connection therein intermediate the mutually adjacent endmost turns in the respective end portions of the coil, is wound about the juncture to tether the end portions of the coil to the network.

10. The traction augmentation device according to claim 9 wherein the ends of the coil remote from the juncture, terminate short of the ends of the strands corresponding thereto in the pair of strands.

11. The traction augmentation device according to claim 8 wherein the coils are wound in opposite helical directions about the pair of mutually adjacent strands, in the directions along the respective longitudinal axes thereof relatively toward the juncture.

12. The traction augmentation device according to claim 8 wherein the three or more strands are interconnected with one another in V-shape formations having their apices at the juncture thereamong.

13. The racaton augmentation device according to claim 12 wherein the V-shaped formations are disposed opposite one another with a single apex therebetween to form an X-shaped sub-pattern of strands having elongated coils loosely helically wound thereabout to form a traction pad within the network at the inner and outer peripheral sides of the one portion of the sock.

14. The traction augmentation device according to claim 12 wherein a multiplicity of the V-shaped formations is symmetrically angularly oriented about a single apex thereamong, to form a star-shaped sub-pattern of strands having elongated coils loosely helically wound thereabout to form a traction pad within the network at the inner and outer peripheral sides of the one portion of the sock.

15. The traction augmentation device according to claim 7 wherein four strands are interconnected with one another in V-shaped formations that are oppositely disposed to one another with the ends of the respective strands therein remote from the respective apices thereof, interconnected with one another to form a diamond-shaped sub-pattern of strands having elongated coils loosely helically wound thereabout to form a traction pad within the network at the inner and outer peripheral sides of the one portion of the sock.

16. The traction augmentation device according to claim 1 wherein the boss is a plate-shaped boss, the face of which is operatively engaged with an interactive surface thereopposite to drive or be driven by the interactive surface in the movement of the boss, and wherein the posterior portion of the sock is intrapositioned across the operatively rearward end of the sock, comprises the network of strands, and has an exoskeleton of the traction generating members supported thereon, so that when the sock is sleeved about the boss, the sock forms a muzzle about the boss for augmenting the traction between the face of the boss and an interactive surface thereopposite, at the footprint of engagement therebetween.

17. The traction augmentation device according to claim 16 wherein the rim portion of the sock comprises a series of resiliently flexible fingers which are generally symmetrically angularly spaced about the axis of the sock to interconnect the network of strands to the loop and engage about the outer periphery of the boss when the sock is sleeved thereabout so that the loop and the posterior portion of the sock engage the axially inwardly oriented annular surface of the flange portion and the face of the sock, respectively, in the partially relaxed condition of the sock.

18. The traction augmentation device according to claim 1 wherein the boss is a wheel-shaped boss, the outer periphery of which is operatively engaged with an interactive surface thermopposite to drive or be driven by the interactive surface in the movement of the boss, and wherein the rim portion of the sock comprises the network of strands and has an exoskeleton of the traction generating members supported thereon, and the posterior portion of the sock is circumposed about the axis of the sock at the operatively rearward end thereof adjacent the rim portion of the sock, so that when the sock is sleeved about the boss, the sock forms an open ended girdle about the boss for augmenting the traction between the perphery of the boss and an interactive surface thereopposite, at the footprint of engagement therebetween.

19. The traction augmentation device according to claim 18 wherein the posterior portion of the sock takes the form of a second continuously uninterrupted loop of resiliently flexible material that engages the face of the boss in an annulus substantially axially opposed to the first mentioned loop of the sock, so that the sock is generally circumferentially balanced about the relatively forward and rearward ends thereof when the sock is sleeved about the boss with the first and second mentioned loops thereof engaged with the axially inwardly oriented annular surface of the flange portion and the face of the boss, respectively, in the partially relaxed condition of the sock.

20. The traction augmentation device according to claim 1 wherein the boss is a plate-shaped boss which is transversely elongated in the direction of movement thereof, and the strands in the network are interconnected with one another in V-shaped formations having apices at the junctures therebetween, and the formations are oriented in the network so that the apices thereof point in a direction parallel to the lengthwise dimension of the boss, when the sock is sleeved thereabout.

21. The traction augmentation device according to claim 1 wherein the boss is a wheel-shaped boss, and the strands in the network are interconnected with one another in V-shaped formations having apices at the junctures therebetween, and the formations are oriented in the network so that the apices thereof point in a direction crosswise the axis of the carier and circumferentially of the boss.

22. The traction augmentation device according to claim 1 wherein the boss is a wheel-shaped boss, and the strands of the network are interconnected with one another in V-shaped formations having apices at the junctures therebetween, and the formations are oriented in the network so the apices thereof point in a direction parallel to the axis of the carrier, when the sock is sleeved about the boss.

\* \* \* \* \*

UNITED STATES PATENT AND TRADEMARK OFFICE
CERTIFICATE OF CORRECTION

PATENT NO. : 5,909,945
DATED : June 8, 1999
INVENTOR(S) : T.E. Noy

It is certified that error appears in the above-identified patent and that said Letters Patent is hereby corrected as shown below:

| COLUMN | LINE | |
|---|---|---|
| 15 (Claim 1, | 33 line 81) | "hi" should read --hard-- |
| 15 (Claim 1, | 38 line 86) | "thercopposite" should read --thereopposite-- |
| 16 (Claim 13, | 61 line 1) | "racaton" should read --traction-- |
| 17 (Claim 18, | 44 line 4) | "thermopposite" should read --thereopposite-- |
| 18 (Claim 18, | 7 line 13) | "perphery" should read --periphery-- |

Signed and Sealed this

Sixteenth Day of November, 1999

*Attest:*

Q. TODD DICKINSON

*Attesting Officer*     *Acting Commissioner of Patents and Trademarks*